United States Patent [19]

Yoshimura

[11] Patent Number: 4,924,724
[45] Date of Patent: May 15, 1990

[54] SHIFT ASSISTING DEVICE

[75] Inventor: Tsuyoshi Yoshimura, Hamamatsu, Japan

[73] Assignee: Sanshin Kogyo Kabushiki Kaisha, Hamamatsu, Japan

[21] Appl. No.: 278,859

[22] Filed: Dec. 2, 1988

[30] Foreign Application Priority Data

Dec. 2, 1987 [JP] Japan .................................. 62-303233

[51] Int. Cl.⁵ ........................ G05G 7/02; F16D 23/12; F16D 21/04
[52] U.S. Cl. ...................................... 74/473 R; 74/96; 74/501.6; 192/21; 192/93 R; 192/99 S; 440/75
[58] Field of Search .................... 74/96, 473 R, 501.6; 192/21, 51, 93 R, 99 S; 440/75, 86

[56] References Cited

U.S. PATENT DOCUMENTS

| 847,754 | 3/1907 | Flinchbaugh | 192/93 R X |
| 1,345,685 | 7/1920 | Masury et al. | |
| 2,966,972 | 1/1961 | Nallinger | 74/473 X |
| 3,139,767 | 7/1964 | Shimanckas | 192/0.098 X |
| 3,153,945 | 10/1964 | Mitchell | 192/0.098 X |
| 3,301,084 | 1/1967 | Boda | 74/501.6 X |
| 3,488,955 | 1/1970 | Buelow | 74/96 X |
| 4,262,622 | 4/1981 | Dretzka et al. | 440/86 X |

Primary Examiner—Allan D. Herrmann
Attorney, Agent, or Firm—Ernest A. Beutler

[57] ABSTRACT

A shift assisting mechanism for a marine transmission including a pair of wire actuators that are connected by means of a pair of levers which are, in turn, connected by a motion transmitting mechanism that provides a lost motion so that excess movement of one of the wire transmitters will not place bending forces on the other of the levers.

5 Claims, 4 Drawing Sheets 4,924,724

SHIFT ASSISTING DEVICE

BACKGROUND OF THE INVENTION

This invention relates to a shift assisting device and more particularly to an improved construction for a remote control operation including flexible transmitters.

The use of flexible transmitters such as bowden wire actuators is common for a wide variety of applications. One typical application for such mechanisms is in the shifting mechanism for a marine transmission. One or more bowden wire actuators are employed for transmitting motion from a remotely positioned shift control lever to a dog clutching element of the transmission. Frequently, these devices employ two flexible transmitters, one for transmitting motion from the control lever to a controlled lever and the other for transmitting movement from the controlled lever to the transmission dog clutching element. Frequently, a shift assisting mechanism is associated with this mechanism for slowing the speed of the engine to assist in shifting.

Although the use of flexible transmitters have a number of advantages, there are still some difficulties with the use of these devices. This is particularly true when two or more flexible transmitters are used in series, as aforedescribed. The reason for this is that it is difficult to match the movement of all of the connected components so that the degrees of travel are all the same. When one element moves father than the others, a force is transmitted to the flexible sheath which causes deflection of the components and which can cause wear. These problems may be best understood by reference to FIGS. 1 and 2. FIG. 1 shows a conventional type of mechanism of the type described and FIG. 2 shows one modification that has been adapted to the conventional systems in an effort to offset the problems aforenoted.

Referring first to FIG. 1, a conventional forward, neutral, reverse transmission of the type normally used in a marine outboard drive is indicated generally by the reference numeral 11. This transmission includes an input shaft 12 to which a driving bevel gear 13 is affixed. The driving bevel gear 13 drives a pair of counterrotating bevel gears 14 and 15 that are journaled on an output shaft 16. A dog clutching sleeve 17 has a splined connection to the output shaft 16 and is axially slidable along it for engagement of dog clutching teeth with corresponding dog clutching teeth on the gears 14 and 15. As a result, the shaft 16 may be driven in either forward or reverse directions. A pivotally supported lever 18 is connected to the dog clutching sleeves 17 for effecting its reciprocation along the shaft 16.

The operation of the dog clutching sleeve 17 is controlled by a remotely positioned shift control lever 19 that is connected to the wire element 21 of a first bowden wire actuator having a protective sheath 22. The bowden wire actuator 21 is connected at its other end to one end of a lever 23 that is supported for pivotal movement about a pivot pin 24 upon a shift assisting and detecting mechanism, to be described.

A second wire element 25 of a second bowden wire actuator is connected at one end to the lever 23 and at its other end to the lever 18. As a result, pivotal movement of the lever 19 will effect pivotal movement of the lever 23 and, accordingly, the lever 18 and reciprocation of the dog clutching sleeve 17.

The second wire actuator 25 is surrounded by a protective sheath 26 that is connected to one end of a shift detecting lever 27. When resistance to the shifting of the dog clutching sleeve 17 occurs, the lever 27 will pivot due to movement of the protective sheath 26 and a proximity switch 28 will be actuated. The proximity switch 28 is connected to a suitable mechanism for slowing the speed of the engine and assisting in shifting. The aforedescribed construction may be considered to be conventional and is well known in this art. For that reason, further description of it or the further illustration of its components are not believed necessary to understand the construction and operation of this invention.

As has been noted, the movement of the wire 21 is transmitted into movement of the wire 25 and when resistance occurs, the flexible sheath 26 will be deflected. However, frequently the range of movement of the control lever 19 does not exactly coincide with the range of pivotal movement of the lever 18 and it is normal that the lever 19 moves to a greater extent than will the lever 18. As a result, some flecture in the wire 25 must result to permit this difference in movement. This flecture of the wire along with the aforenoted flecture of the protective sheath 26 can cause wear, difficult operation and other disadvantages.

To partially offset these disadvantages, there has been proposed an arrangement wherein the end of the wire 25 has some form of lost motion connection to the lever 23 and this arrangement is shown in FIG. 2. In this figure, components which are substantially the same as the previously described construction have been identified by the same reference numerals.

In this construction, the end of the wire 25 that is connected to the lever 23 is received within a slot 31 of the lever. As a result, when the control moves through the distance 1, the lever 23 is pivoted through the arc with the pivotal connection of the wire 21 moving through the radius Rr. Since the point of connection of the wire 25 to the lever 23 is closer to the pivot point 24 of this lever, there will be a smaller radius Rd at this pivotal connection. However, if the lever 23 tends to move at a distance to cause the wire 25 to want to move a greater distance L—L', than the corresponding distance 1 of the lever 21, this may be accommodated through movement of the end of the wire 25 from the position a to the position a' along the slot 31. Hence, this device does somewhat reduce the loading on the mechanism. However, it does not fully accommodate all situations, particularly when there is play in both directions of the movement of the lever 19.

It is, therefore, a principal object of this invention to provide an improved shift assisting device.

It is a further object of this invention to provide an improved mechanism for the shifting of a marine transmission.

It is a yet further object of this invention to provide a shifting device for a mechanism embodying a wire transmitter wherein an arrangement is incorporated so as to prevent undue loading of the wire transmitter due to difference in range of movement of the control member from the controlled member.

SUMMARY OF THE INVENTION

This invention is adapted to be embodied in a shifting mechanism for a cable operated transmission that comprises a control member moveable through a range of control movement. A controlled member is moveable through a range of movement. A first wire actuator is connected to the control member at one end and to a first lever at its other end. A second wire actuator is connected to the controlled member at one end and to a second lever at its other end. Motion transmitting means transmits pivot movement of the first lever into pivotal movement of the second lever during one range of movement and provides for movement of the first lever without pivotal movement of the second lever during the other range of movement for providing a range of lost motion between the first and second wire actuators.

DETAILED DESCRIPTION OF THE PREFERRED EMBODIMENT

Figure 1:
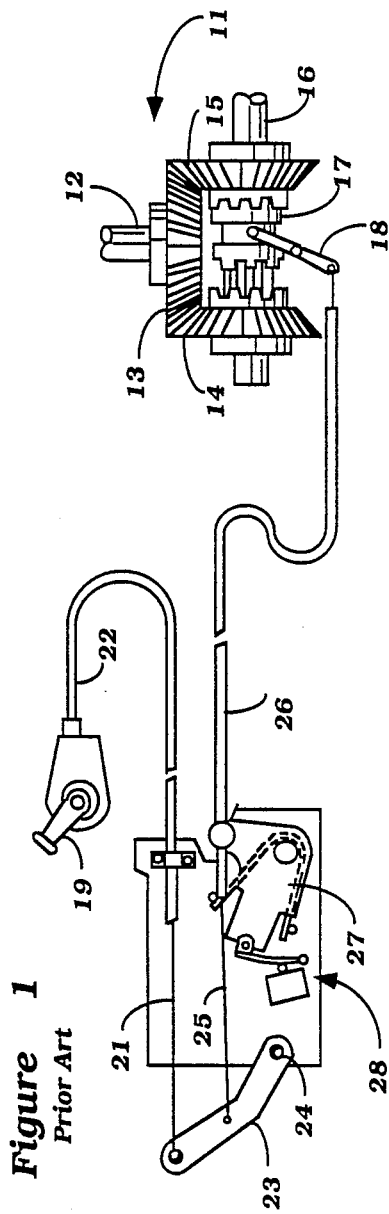
FIG. 1 is a view showing in partially schematic form a prior art type of marine transmission including a prior art wire actuator control.
Figure 2:
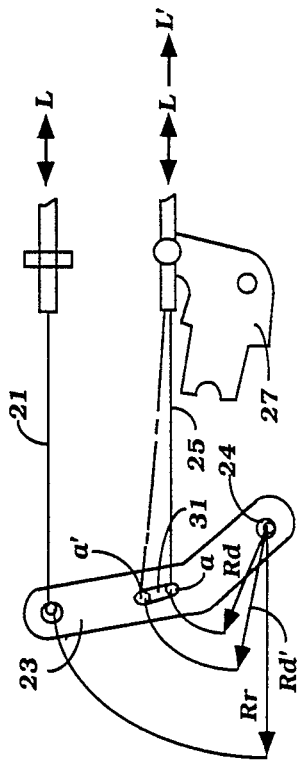
FIG. 2 is a partial view of a wire actuator controlled transmission that is constructed to offset some of the disadvantages of the construction shown in FIG. 1.
Figure 3:
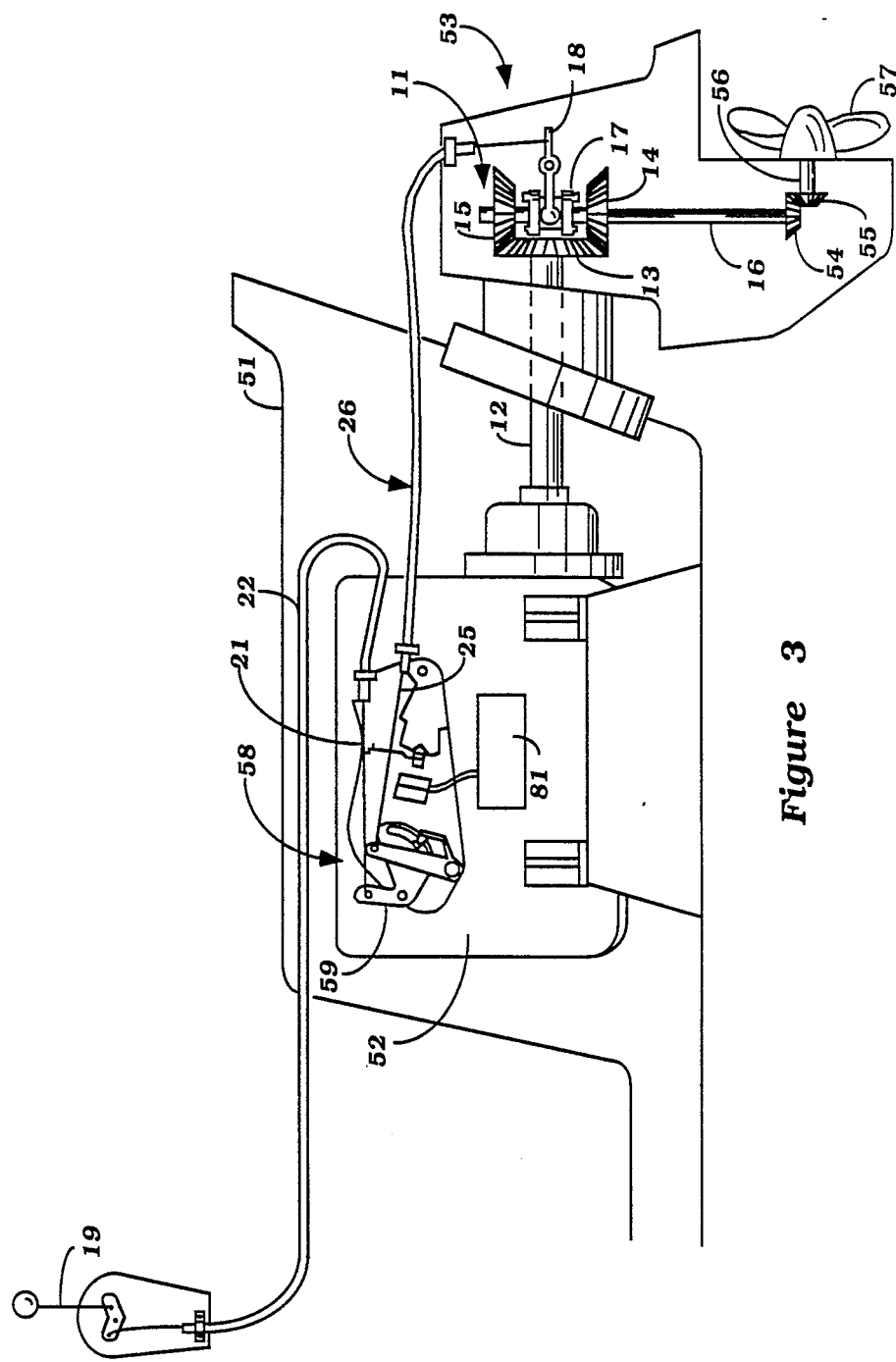
FIG. 3 is a side elevational view, with portions shown in section and other portions shown schematically of a marine inboard/outboard drive embodying a shift assisting device constructed in accordance with an embodiment of the invention.

Referring first to FIG. 3, the invention is described in conjunction with a watercraft, indicated generally by the reference numeral 51 powered by an inboard/outboard drive arrangement that consists of an internal combustion engine 52 that is mounted within the hull of the watercraft 51 and which drives an outboard drive unit, indicated generally by the reference numeral 53. The outboard drive unit 53 includes a forward, neutral, reverse transmission of the type generally shown in FIG. 1. Although the components are oriented in a slightly different arrangement, they are substantially the same and for that reason the transmission has been identified by the same reference numeral 11 as used in FIG. 1 and those components of the transmission which are functionally the same have also been identified by the same reference numerals. For this reason, further description of this construction is not believed to be required.

As will be seen, the output shaft 16 comprises a vertically extending drive shaft that extends through the outboard drive unit 53 and which has a bevel gear 54 affixed to its lower end. The bevel gear 54 meshes with a driven bevel gear 55 that is secured to a propeller shaft 56 for driving a propeller 57 in a known manner.

As is also well known in this art, the outboard drive unit 53 is supported for steering movement about a generally vertically extending axis and tilt and trim movement about a generally horizontally extending axis by any known type of mechanism. For that reason, that mechanism is not illustrated.

A transmission control lever 19 is provided for operating the dog clutching sleeve 17 through a first bowden wire actuator comprised of a wire 21 and surrounding protective sheath 22 and a second wire actuator 25 and surrounding protective sheath 26. Since these components are the same as the prior art construction shown in FIG. 1, they are also identified by the same reference numerals. However, this embodiment incorporates a substantially different shift assisting mechanism, which is indicated generally by the reference numeral 58 and which will be described in more detail first by particular reference to FIG. 4.

Unlike the prior art constructions, the motion is transmitted from the first wire actuator 21 to the second wire actuator 25 through a lever pair 59 that is comprised of a first lever 61 and a second lever 62. A motion transmitting mechanism, indicated generally by the reference numeral 63 and having a construction as to described transmits motion from the first lever 61 to the second lever 62 with lost motion to both ends of the travel. The first lever 61 is mounted on a mounting plate 64 for pivotal movement about a first pivot axis defined by a pivot pin 65. The second lever 62 is mounted for pivotal movement about a parallel pivot axis on the mounting plate 64 by means of a second pivot pin 66. The motion transmitting mechanism 63 is comprised of a cam groove 67 formed in the lever 61 and comprised of a first portion 68 and a pair of end portions 69 and 71.

The second lever 62 has an offset arm portion 72 that carries a roller follower 73 that is received within the cam groove 68 for transmitting motion between the lever 61 and the lever 62.

Figure 4:
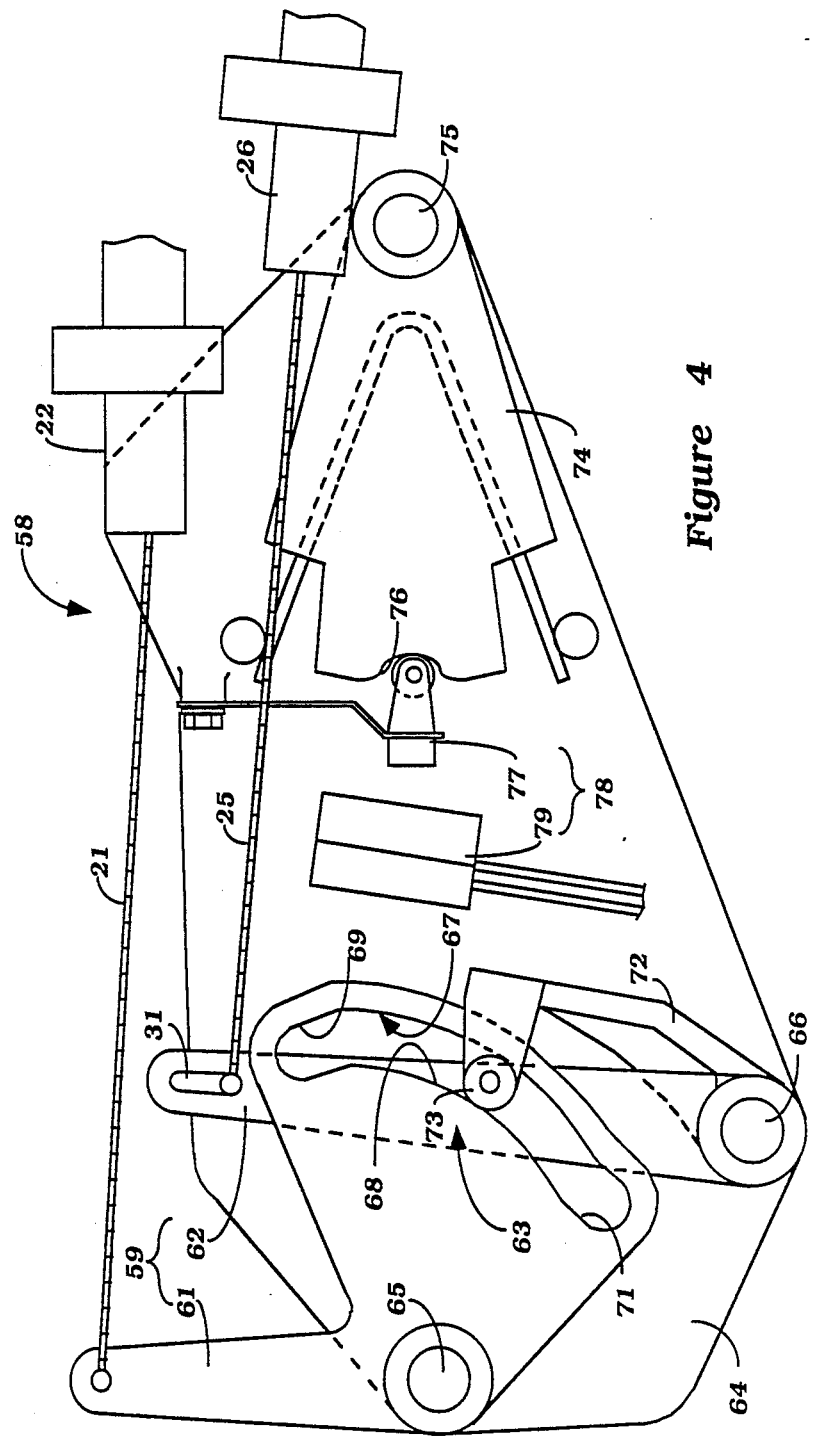
FIG. 4 is an enlarged side elevational view of the shift assisting device.
Figure 5:
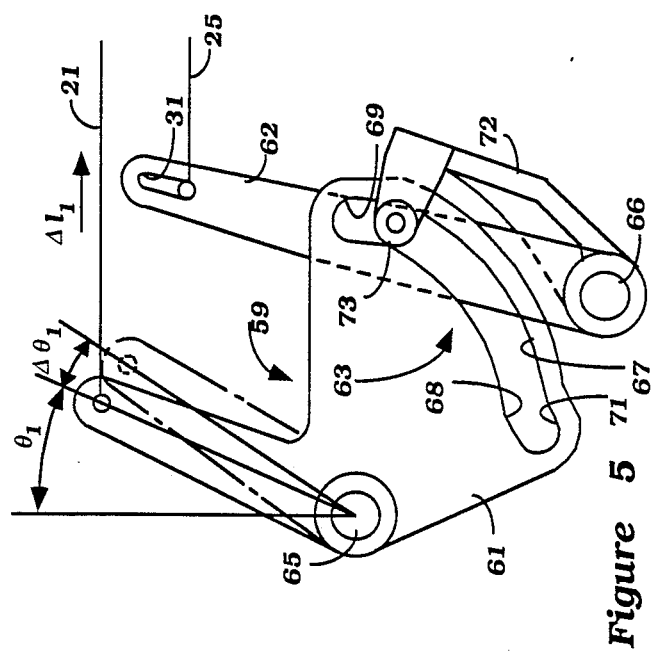
FIG. 5 is a view showing the shift assisting levers in one position of operation.

FIG. 5 shows the motion which occurs during shifting from the neutral position, as shown in FIG. 4, to the forward drive position as shown in FIG. 5. As the wire 21 moves sufficiently so as to rotate the lever 61 through the angle $\theta_1$, the cam slot 68 will rotate and effect pivotal movement of the lever 62 sufficiently so as to effect the dog clutching sleeve 17 to move into engagement with the forward drive gear 14. At the completion of this shift, the roller follower 73 will be at the end of the groove portion 68. Therefore, if the shift lever is moved a greater distance so as to move the control wire 21 through the distance $\Delta l_1$, and pivot the lever 61 through the additional angle $\Delta \theta_1$, the roller follower 73 will enter the groove portion 69. The groove portion 69 has an arcuate radius of curvature coincident with the pivot axis 65 so that continued movement will not effect any movement of the lever 62 and, therefore, there will be no bending stresses applied to the wire 25.

Figure 6:
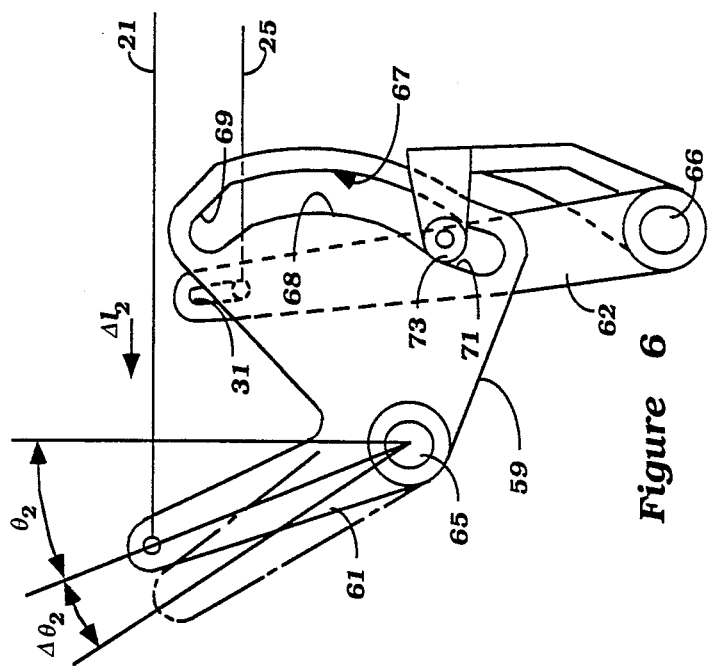
FIG. 6 is a view, in part similar to FIG. 5, showing the shift assisting levers in another position.

In a similar manner, when the lever 61 is pivoted through the angle $\theta_2$ in the opposite direction from the neutral position, the follower 73 will traverse the cam groove 68 so as to pivot the lever 62 sufficiently to tension the wire transmitter 25 and effect shifting of the dog clutching sleeve 17 into engagement with the rearward drive gear 15 (FIG. 6). At this point, the follower 73 will be at the opposite end of the groove portion 68 as shown in FIG. 6. If additional movement of the shift control lever 19 causes the wire transmitter 21 to move through the angle $\Delta l_2$ and pivot the lever 61 through the additional angle $\Delta \theta_2$, the follower 73 enters the cam groove portion 71. Like the cam groove portion 69, the cam groove portion 71 has a curved radius about the pivot axis 65 so that no further pivotal movement of the lever 62 will occur. Therefore, no stresses will be placed on the wire 25 in this direction.

Referring again to FIG. 4, the shift assisting mechanism includes a lever 74 that is pivotal on the plate 64 about a pivot pin 75 and which is connected to one end of the sheath 26. The lever 74 has a detent portion 76 in which a spring biased arm 77 of a detector mechanism, indicated generally by the reference numeral 78 is normally received. In the event there is a resistance to shifting, the wire sheath 26 will move and effect pivotal movement of the lever 74 so as to cause the detector element 77, which comprises a permanent magnet, to move into proximity with a detector 79 so as to provide a signal to a shift control circuit 81 so as to reduce the speed of the engine 52 in a known manner and assist in shifting.

It should be apparent from the foregoing description that this construction provides a smooth shift assist while at the same time avoiding undue stresses in bending of the wire actuators due to the difference in movement of the two of them. Although an embodiment of the invention is illustrated and described, various changes and modifications may be made without departing from the spirit and scope of the invention, as defined by the appended claims.

I claim:

1. In a shift mechanism for a cable operated transmission comprised of a control member actuated by an operator and moveable through a range of control movement, a controlled member moveable through a range of movement and associated with a transmission for operating said transmission upon such movement, a first wire actuator connected to said control member at one end and to a first lever at its other end, a second wire actuator connected to said controlled member at one end and to a second lever at the other end, and motion transmitting means for transmitting pivotal movement of said first lever into pivotal movement of said second lever during one range of movement and pivotal movement of said first lever without pivotal movement of said second lever during another range of movement at one extreme end of said first range for providing a range of lost motion between said first and said second levers.

2. In a shift mechanism as set forth in claim 1 wherein the motion transmitting means further includes means for providing a third range of movement for providing for pivotal movement of the first lever without pivotal movement of the second lever at the other extreme of the first range of movement.

3. In a shift mechanism as set forth in claim 2 wherein the motion transmitting means comprises cam means formed on one of the levers and follower means formed on the other of the levers.

4. In a shift mechanism as set forth in claim 3 wherein the cam means comprises a slot having a first portion for effecting movement of the second lever and a second portion at one end of said first portion curved about the pivot axis of the first lever for effecting no movement of the second lever.

5. In a shift mechanism as set forth in claim 4 further including a third portion at the other end of the first portion and curved about the axis of rotation of the first lever for effecting no pivotal movement of the second lever when the first lever moves in the opposite range of movement.

* * * * *